United States Patent
Venton-Walters et al.

(10) Patent No.: US 9,581,153 B2
(45) Date of Patent: Feb. 28, 2017

(54) PUMP FOR VEHICLE SUSPENSION SYSTEM

(71) Applicant: Oshkosh Corporation, Oshkosh, WI (US)

(72) Inventors: Roy Venton-Walters, Neshkoro, WI (US); Aaron J. Rositch, Oshkosh, WI (US); Erik Ellifson, Oshkosh, WI (US); Jason J. Zuleger, Appleton, WI (US); Joseph Krebs, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 71 days.

(21) Appl. No.: 14/341,489

(22) Filed: Jul. 25, 2014

(65) Prior Publication Data

US 2014/0334956 A1 Nov. 13, 2014

Related U.S. Application Data

(63) Continuation of application No. 13/943,632, filed on Jul. 16, 2013, now Pat. No. 8,821,130, which is a continuation of application No. 12/910,653, filed on Oct. 22, 2010, now Pat. No. 8,596,648.

(51) Int. Cl.
| | |
|---|---|
| *F04B 43/06* | (2006.01) |
| *F04B 45/04* | (2006.01) |
| *F04B 43/00* | (2006.01) |
| *F04B 43/073* | (2006.01) |
| *B60G 17/04* | (2006.01) |

(52) U.S. Cl.
CPC ........... *F04B 45/04* (2013.01); *B60G 17/0408* (2013.01); *F04B 43/0054* (2013.01); *F04B 43/06* (2013.01); *F04B 43/073* (2013.01); *F05C 2225/00* (2013.01); *F05C 2225/08* (2013.01)

(58) Field of Classification Search
CPC ....... F04B 43/0054; F04B 43/02; F04B 43/04; B60G 17/0408
See application file for complete search history.

(56) References Cited

U.S. PATENT DOCUMENTS

| | | |
|---|---|---|
| 2,662,478 A | 12/1953 | Surre |
| 2,736,332 A | 2/1956 | Simmons |
| 3,053,270 A | 9/1962 | Campbell |
| 3,605,566 A | 9/1971 | Vetter |
| 3,661,060 A | 5/1972 | Bowen |

(Continued)

FOREIGN PATENT DOCUMENTS

| | | |
|---|---|---|
| DE | 199 01 893 | 6/2000 |
| EP | 1 134 415 | 9/2001 |

OTHER PUBLICATIONS

U.S. Appl. No. 13/841,686, filed Mar. 15, 2013, Oshkosh Corporation.

(Continued)

*Primary Examiner* — Patrick Hamo
(74) *Attorney, Agent, or Firm* — Foley & Lardner LLP

(57) ABSTRACT

A pump includes a housing defining an interior volume, a diaphragm partitioning the interior volume into a pumping chamber and an actuating chamber, a diaphragm support associated with the actuating chamber and configured to limit movement of the diaphragm, and a dispersion element coupled to the housing. The dispersion element includes a network of channels that is configured to distribute a fluid within the pump.

10 Claims, 14 Drawing Sheets

(56) References Cited

U.S. PATENT DOCUMENTS

| | | | |
|---|---|---|---|
| 3,668,978 A | 6/1972 | Bowen | |
| 3,715,174 A | 2/1973 | Davis et al. | |
| 4,430,048 A | 2/1984 | Fritsch | |
| 4,447,073 A * | 5/1984 | Brandstadter | B62D 55/1125 |
| | | | 280/124.129 |
| 4,781,535 A | 11/1988 | Frawley et al. | |
| 4,881,876 A | 11/1989 | Laziou | |
| 5,188,515 A | 2/1993 | Horn | |
| 5,217,083 A | 6/1993 | Bachhuber et al. | |
| 5,378,010 A | 1/1995 | Marino et al. | |
| 5,417,299 A | 5/1995 | Pillar et al. | |
| 5,454,698 A * | 10/1995 | Yokoi | F04B 7/02 |
| | | | 137/625.18 |
| 5,538,274 A | 7/1996 | Schmitz et al. | |
| 5,820,150 A | 10/1998 | Archer et al. | |
| 6,086,074 A | 7/2000 | Braun | |
| 6,105,984 A | 8/2000 | Schmitz et al. | |
| 6,327,960 B1 | 12/2001 | Heimueller et al. | |
| 6,516,914 B1 | 2/2003 | Andersen et al. | |
| 6,520,494 B1 | 2/2003 | Andersen et al. | |
| 6,561,718 B1 | 5/2003 | Archer et al. | |
| 6,582,206 B2 | 6/2003 | Schluecker | |
| 6,622,397 B1 | 9/2003 | Knoble | |
| 6,764,085 B1 | 7/2004 | Anderson | |
| 6,779,806 B1 | 8/2004 | Breitbach et al. | |
| 6,860,332 B1 | 3/2005 | Archer et al. | |
| 6,882,917 B2 | 4/2005 | Pillar et al. | |
| 6,918,721 B2 | 7/2005 | Venton-Walters et al. | |
| 6,976,688 B2 | 12/2005 | Archer et al. | |
| 7,060,422 B2 | 6/2006 | Biberger et al. | |
| 7,073,620 B2 | 7/2006 | Braun et al. | |
| 7,108,253 B2 | 9/2006 | Venton-Walters et al. | |
| 7,140,461 B2 | 11/2006 | Morrow | |
| 7,153,286 B2 | 12/2006 | Busby et al. | |
| 7,207,582 B2 | 4/2007 | Siebers et al. | |
| 7,258,194 B2 | 8/2007 | Braun et al. | |
| 7,357,203 B2 | 4/2008 | Morrow et al. | |
| 7,389,826 B2 | 6/2008 | Linsmeier et al. | |
| 7,392,122 B2 | 6/2008 | Pillar et al. | |
| 7,756,621 B2 | 7/2010 | Pillar et al. | |
| 7,856,998 B2 | 12/2010 | Bauer | |
| 7,874,373 B2 | 1/2011 | Morrow et al. | |
| 7,878,750 B2 | 2/2011 | Zhou et al. | |
| 7,963,204 B2 | 6/2011 | Venton-Walters et al. | |
| 8,197,231 B2 | 6/2012 | Orr | |
| 8,206,338 B2 | 6/2012 | Childers et al. | |
| 8,333,390 B2 | 12/2012 | Linsmeier et al. | |
| 8,376,077 B2 | 2/2013 | Venton-Walters | |
| 8,376,719 B2 | 2/2013 | Grady et al. | |
| 8,465,025 B2 | 6/2013 | Venton-Walters et al. | |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,801,393 B2 | 8/2014 | Crabtree et al. | |
| 8,821,130 B2 | 9/2014 | Venton-Walters et al. | |
| 2001/0038796 A1 | 11/2001 | Schluecker | |
| 2001/0043872 A1 | 11/2001 | Schluecker | |
| 2003/0110939 A1 | 6/2003 | Able et al. | |
| 2007/0077156 A1 | 4/2007 | Orr | |
| 2008/0284118 A1 | 11/2008 | Venton-Walters et al. | |
| 2009/0174158 A1 | 7/2009 | Anderson et al. | |
| 2010/0116569 A1 | 5/2010 | Morrow et al. | |
| 2010/0289238 A1 | 11/2010 | Archer et al. | |
| 2011/0079978 A1 | 4/2011 | Schreiner et al. | |
| 2011/0114409 A1 | 5/2011 | Venton-Walters | |
| 2011/0169240 A1 | 7/2011 | Schreiner et al. | |
| 2012/0098215 A1 | 4/2012 | Rositch et al. | |
| 2012/0234638 A1 | 9/2012 | Ellifson et al. | |
| 2013/0249175 A1 | 9/2013 | Ellifson | |
| 2014/0251742 A1 | 9/2014 | Dillman et al. | |
| 2014/0265203 A1 | 9/2014 | Zuleger et al. | |
| 2014/0291945 A1 | 10/2014 | Venton-Walters et al. | |

OTHER PUBLICATIONS

U.S. Appl. No. 14/334,305, filed Jul. 17, 2014, Oshkosh Corporation.
International Search Report and Written Opinion regarding International Application No. PCT/US2011/056551, mail date Apr. 23, 2013, 10 pages.
Invitation to Pay Additional Fees and Partial Search Report regarding International Application No. PCT/US2011/056551 mail date Feb. 13, 2012, 5 pages.
Written Opinion regarding International Application No. PCT/US2011/056551, mail date May 10, 2012, 9 pages.

* cited by examiner

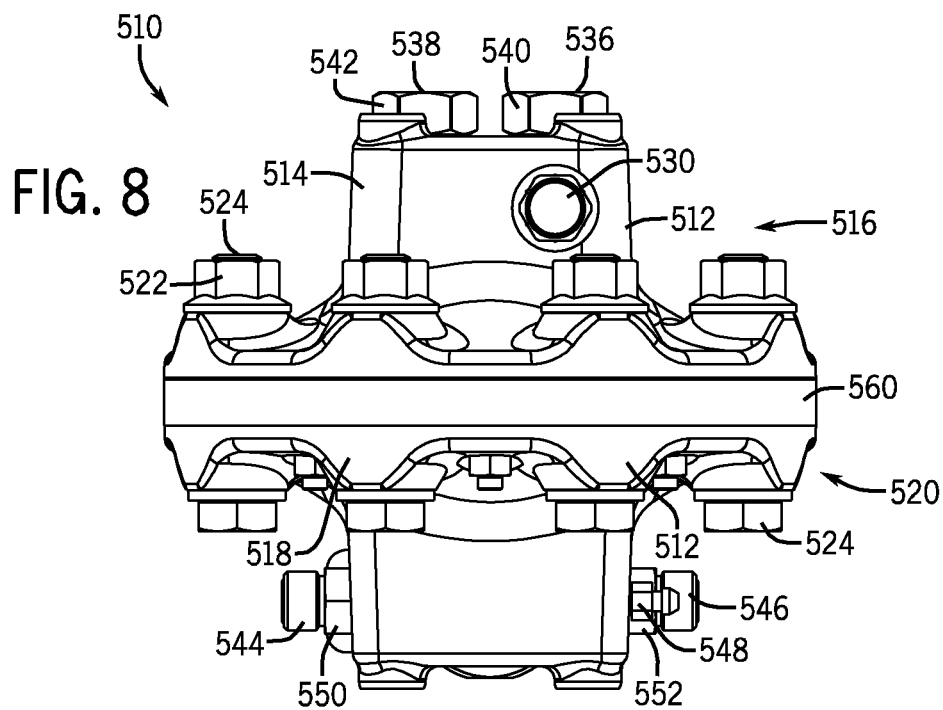
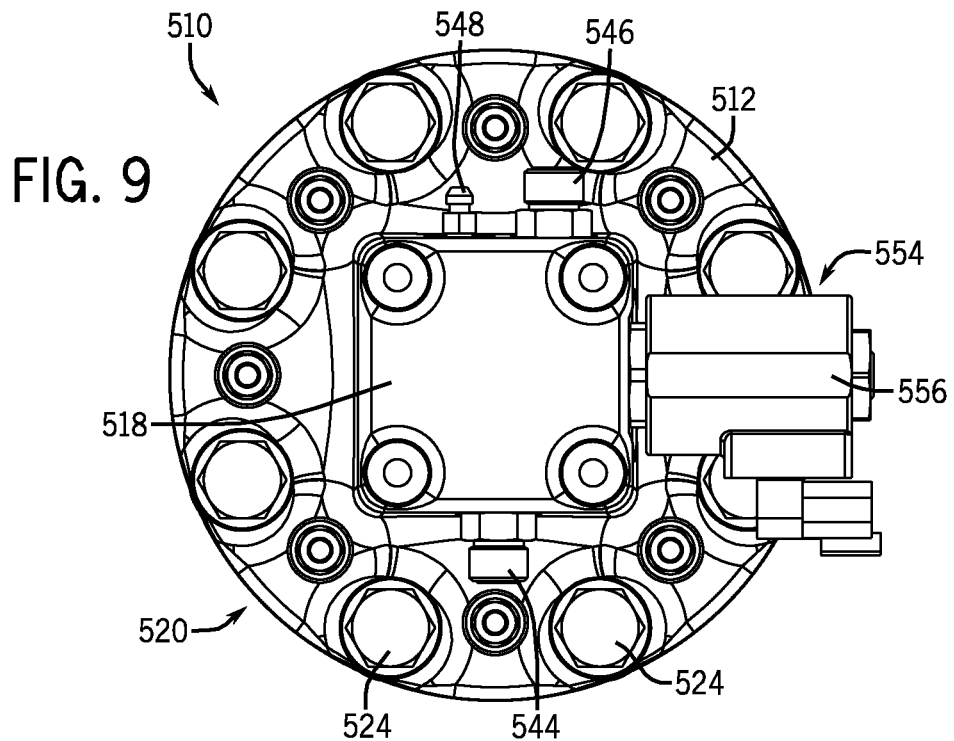

PUMP FOR VEHICLE SUSPENSION SYSTEM

CROSS-REFERENCE TO RELATED APPLICATIONS

This is a continuation of application Ser. No. 13/943,632, filed Jul. 16, 2013, which is a continuation of application Ser. No. 12/910,653, filed Oct. 22, 2010, now U.S. Pat. No. 8,596,648, which are incorporated herein by reference in their entireties.

BACKGROUND

The present application relates to a high-pressure gas pump for a vehicle suspension system.

SUMMARY

One embodiment of the invention relates to a pump that includes a housing defining an interior volume, a diaphragm partitioning the interior volume into a pumping chamber and an actuating chamber, a diaphragm support associated with the actuating chamber and configured to limit movement of the diaphragm, and a dispersion element coupled to the housing. The dispersion element includes a network of channels that is configured to distribute a fluid within the pump.

Another embodiment of the invention relates to a pump that includes a housing defining an interior volume, a diaphragm coupled to the housing, and a modulating assembly. The diaphragm partitions the interior volume into a pumping chamber and an actuating chamber. The housing includes an inlet configured to be coupled to a high pressure fluid line and an outlet configured to be coupled to a low pressure fluid line. The housing defines a flow path between the inlet, the outlet, and the actuating chamber. The modulating assembly is in fluid communication with the diaphragm and is positioned along the flow path to selectively place the actuating chamber in fluid communication with the inlet or the outlet.

Yet another embodiment of the invention relates to a vehicle suspension system that includes a gas spring, a gas storage container, and a bi-directional diaphragm pump that is coupled to the gas spring and the gas storage container. Adding or removing gas from the gas spring changes the length of the gas spring. The bi-directional diaphragm pump is configured to selectively operate in a first mode to increase a ride height of the vehicle suspension system by providing gas from the gas storage container to the gas spring and a second mode to decrease the ride height of the vehicle suspension system by providing gas from the gas spring to the gas storage container.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which:

FIG. 8 is a rear view of the pump of FIG. 5.

FIG. 9 is a bottom view of the pump of FIG. 5.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
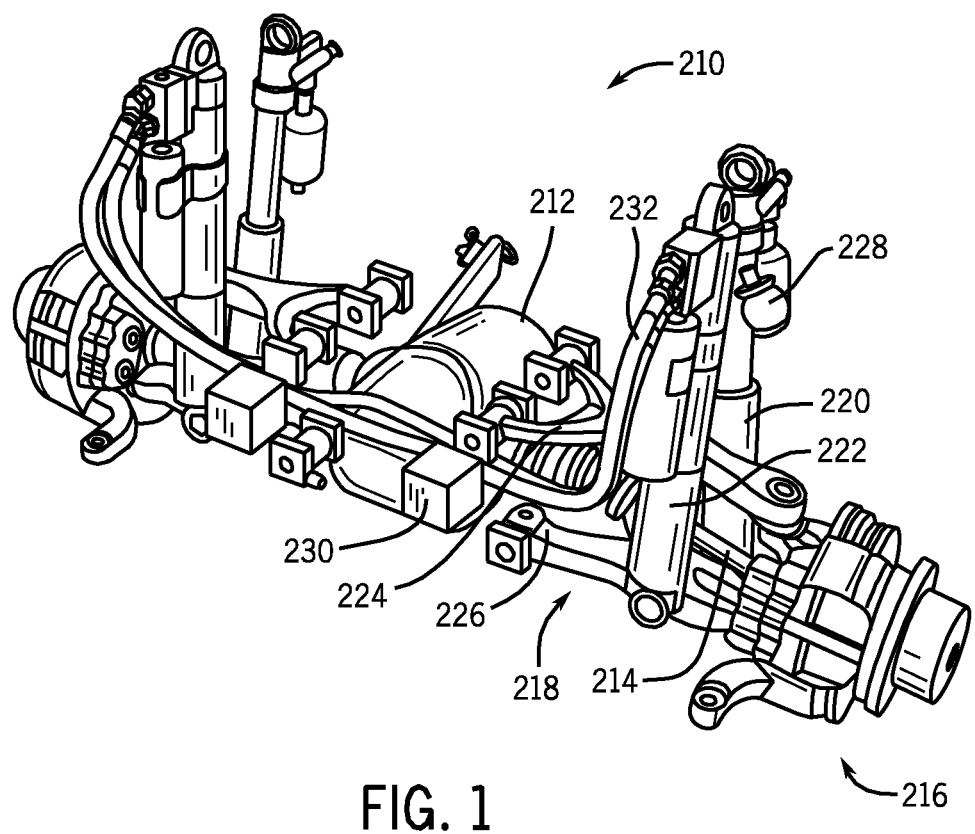
FIG. 1 is a perspective view of an axle assembly according to an exemplary embodiment of the invention.

According to one embodiment of the invention, a vehicle may include a body supported by an axle assembly 210 (FIG. 1). In some embodiments, the vehicle may be a military vehicle. In other embodiments, the vehicle may be a utility vehicle, such as a fire truck, a tractor, construction equipment, or a sport utility vehicle. The vehicle may be configured for operation on both paved and rough, off-road terrain. As such, a suspension system 218 (FIG. 2) may be correspondingly configured to support the weight of the vehicle while providing comfortable ride quality on both paved and rough, off-road terrain. In some embodiments, the suspension system 218 is configured to change the ride height of the vehicle by lifting or lowering the body of the vehicle with respect to the ground.

Referring to FIG. 1, the axle assembly 210 is configured for use with the vehicle. According to an exemplary embodiment, the axle assembly 210 includes a differential 212 connected to half shafts 214, which are each connected to a wheel end assembly 216. Movement of the wheel end assembly 216 is at least partially controlled (e.g., supported) by a suspension system 218, which includes a spring 220, a damper 222, an upper support arm 224, and a lower support arm 226 coupling the wheel end assembly 216 to the vehicle body or a part thereof (e.g., chassis, side plate, hull).

According to an exemplary embodiment, the differential 212 is configured to be connected with a drive shaft of the vehicle, receiving rotational energy from a prime mover of the vehicle, such as a diesel engine. The differential 212 allocates torque provided by the prime mover between half shafts 214 of the axle assembly 210. The half shafts 214 then deliver rotational energy to the wheel-end assemblies 216 of the axle assembly 210. The wheel end assemblies 216 may include brakes, gear reductions, steering components, wheel hubs, wheels, and other features. As the vehicle travels over uneven terrain, the upper and lower support arms 224, 226 at least partially guide movement of each wheel end assembly 216, and a stopper 228 provides an upper limit to movement of the wheel end assembly 216.

Figure 2:
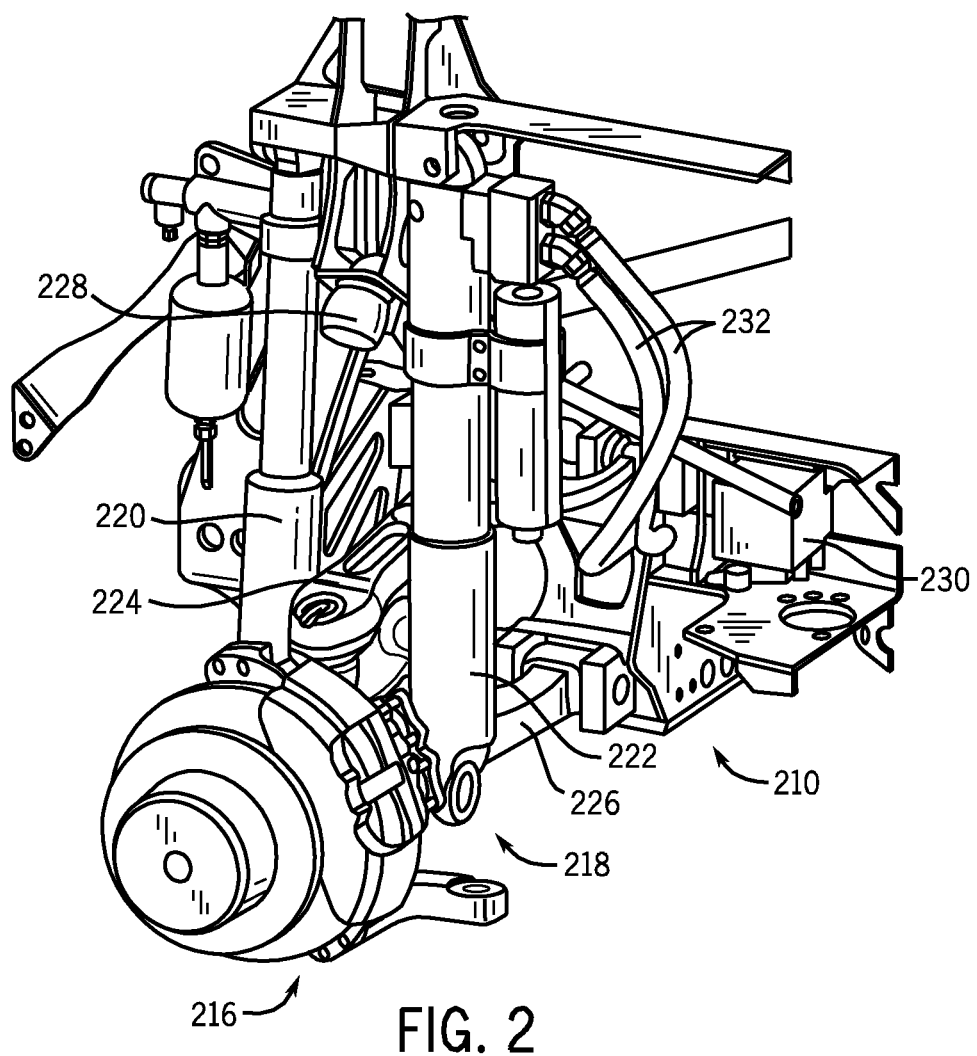
FIG. 2 is a perspective view of a suspension system of the axle assembly of FIG. 1.

Referring to FIG. 2, according to an exemplary embodiment the suspension system 218 includes one or more high-pressure gas components, where the spring 220 is a high-pressure gas spring 220. In some embodiments, the suspension system 218 further includes at least one high-pressure gas pump 230. The suspension system 218 may include separate high-pressure gas pumps 230 associated with each spring 220, may include a pump 230 for two springs 220 of the axle assembly 210, may include a single pump for springs 220 of multiple axle assemblies (e.g., front and rear), or may include other combinations of springs and pumps. In preferred embodiments, the gas of the pump 230 and spring 220 is an inert gas such as nitrogen, argon, helium, etc. (e.g., consisting of at least 90%, at least 95% the inert gas), which may be stored, provided, or received in one or more reservoirs (e.g., central reservoir, canister, tank) (not shown) coupled to the vehicle.

During operation, the pump 230 selectively provides gas, under pressure, to the high-pressure gas spring 220 or to reservoirs, tanks, accumulators, or other devices. In some contemplated embodiments, one or more gas dampers 222 of the vehicle receive high-pressure gas from the pump 230. In other embodiments, the dampers 222 are hydraulic dampers. The dampers 222 may be cross-plumbed via lines 232 (e.g., hydraulic lines, high-pressure gas lines) connecting dampers 222 on opposite sides of the axle assembly 210, between dampers 222 in a "walking beam" configuration for a tandem axle, or between dampers 222 on separate axle assemblies of the vehicle (e.g., between dampers located front-to-back, or diagonally located with respect to each other).

Figure 3:
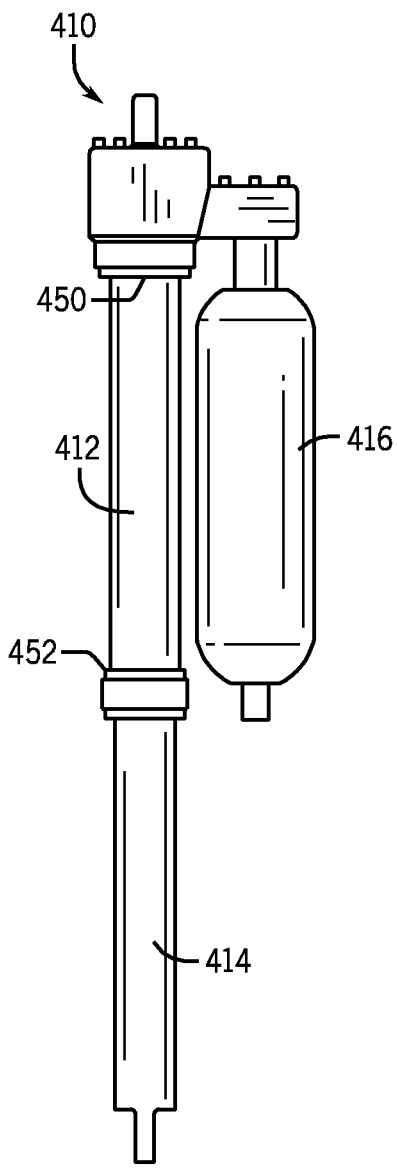
FIG. 3 is a side view of a gas spring of a suspension system according to an exemplary embodiment of the invention.
Figure 4:
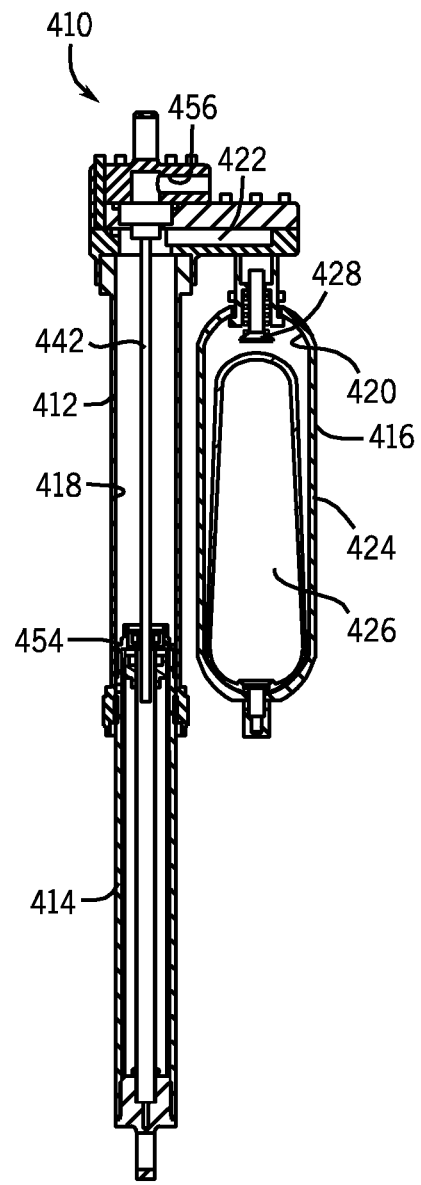
FIG. 4 is a sectional view of the gas spring of FIG. 3.
Figure 5:
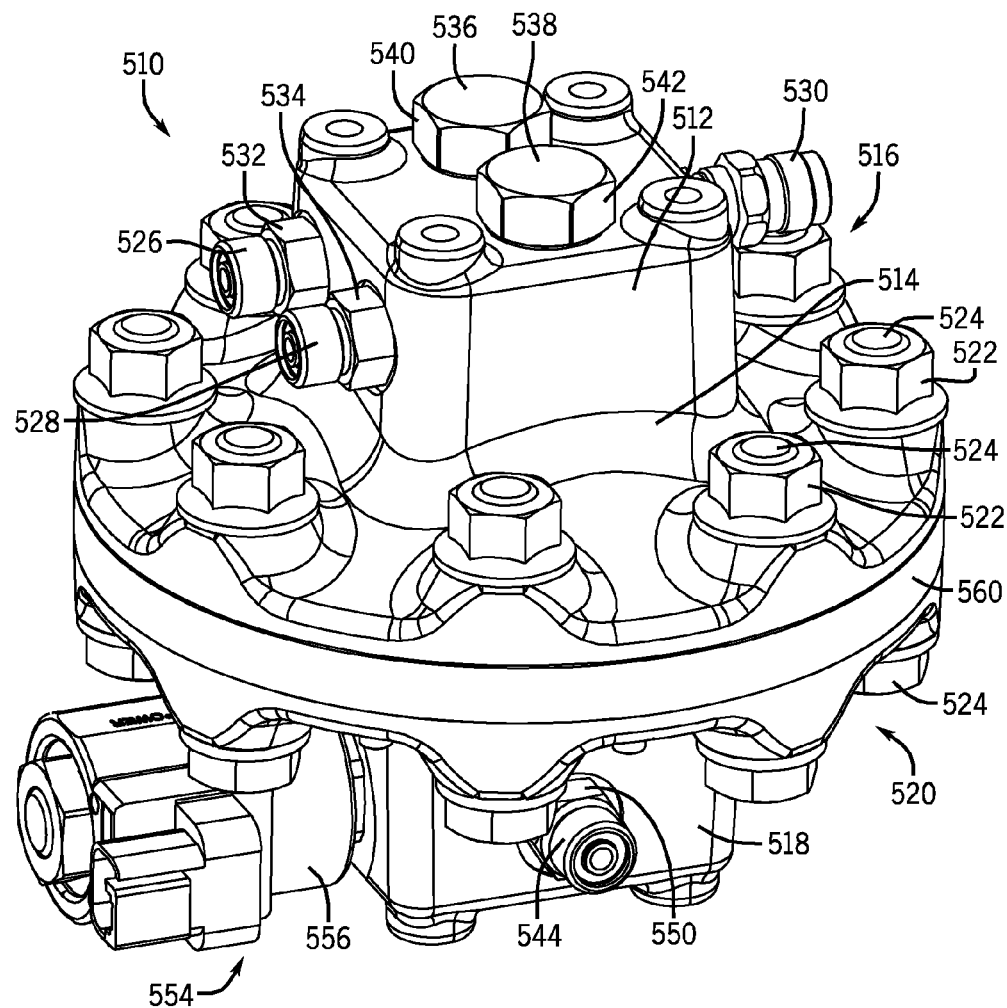
FIG. 5 is a right side perspective view from above of a pump according to an exemplary embodiment of the invention.
Figure 6:
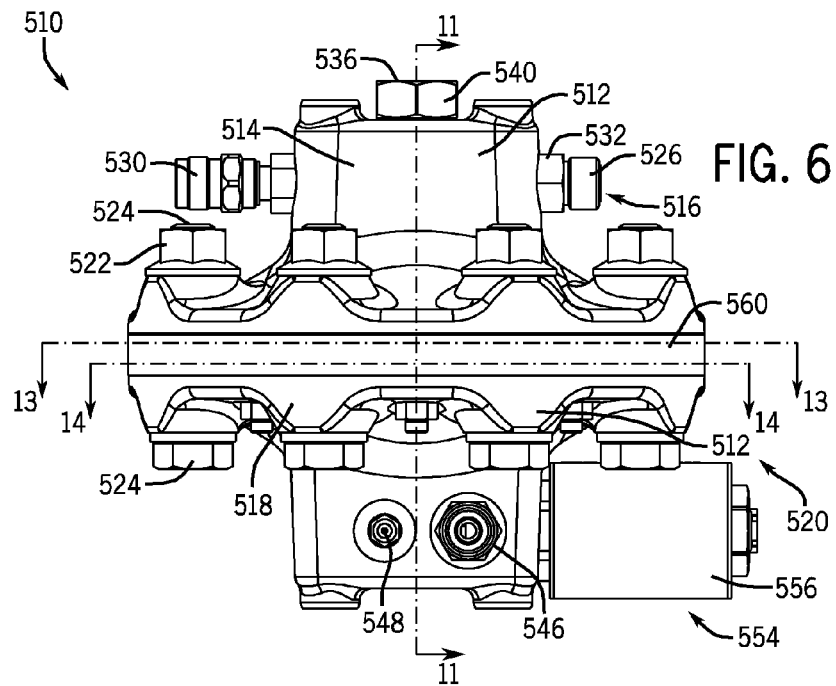
FIG. 6 is a left side view of the pump of FIG. 5.
Figure 7:
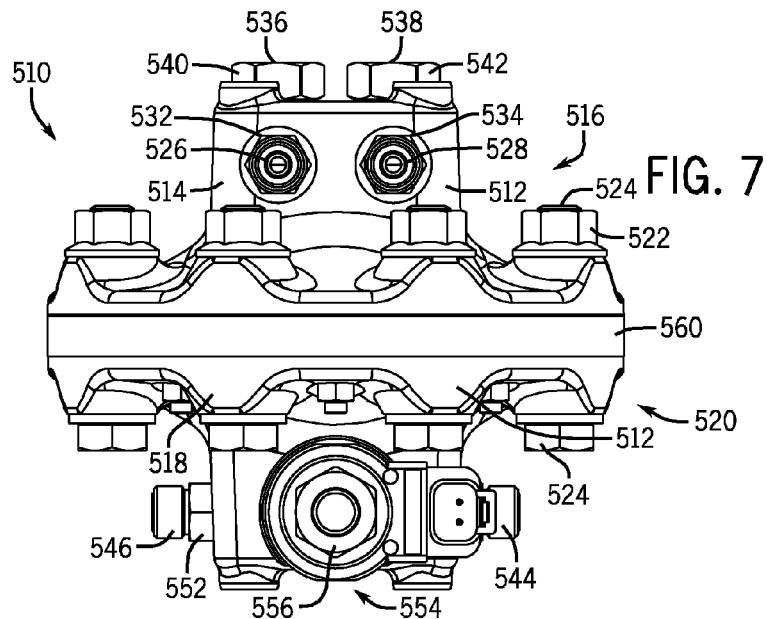
FIG. 7 is a front view of the pump of FIG. 5.
Figure 10:
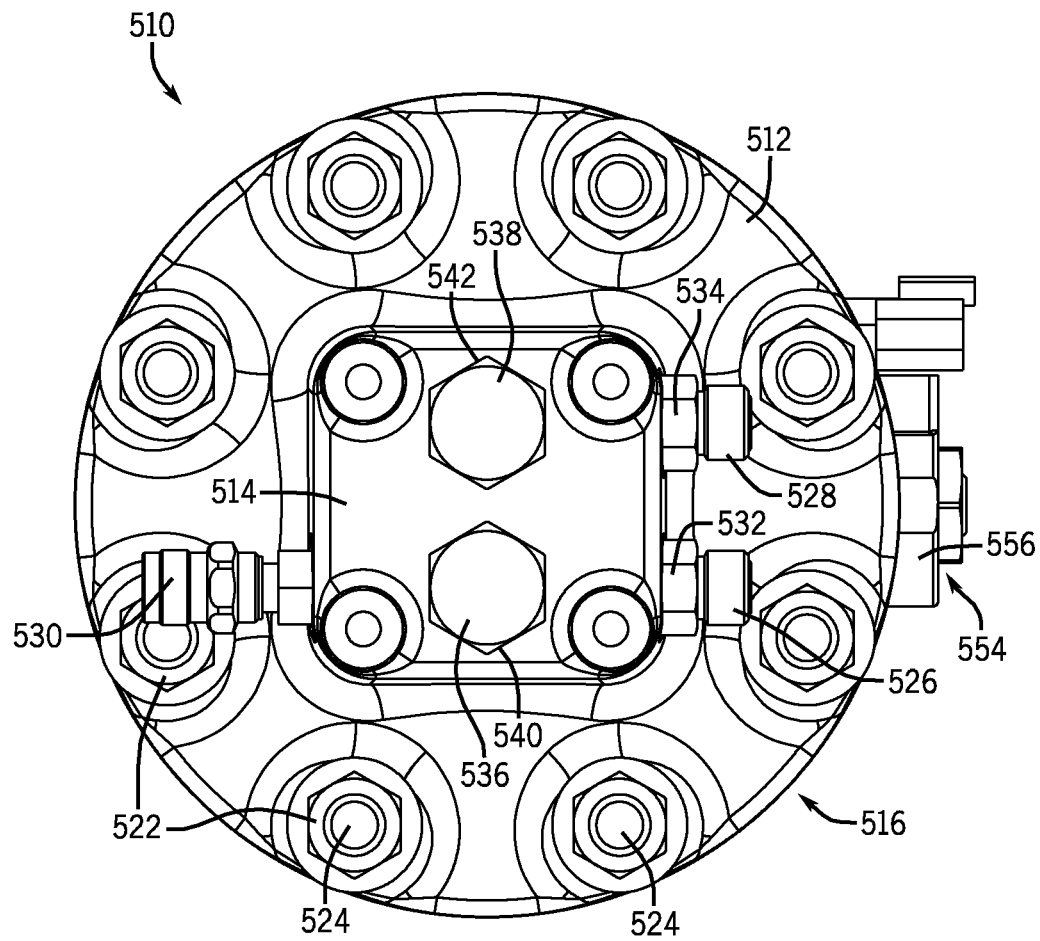
FIG. 10 is a top view of the pump of FIG. 5.

Referring to FIGS. 3-4, a gas spring 410 includes a cylinder 412 coupled to a rod 414 (FIG. 4). The cylinder 412 has a cap end 450 and a rod end 452 with a side wall (e.g., cylindrical side wall) extending between the cap and rod ends 450, 452. A chamber 418 is formed between the cylinder 412 and the rod 414 (e.g., interior to the cylinder 412, between the cap end 450 and the rod 414). Nitrogen or another gas held in the chamber 418 compresses or expands in response to relative movement between the rod 414 and the cylinder 412 to provide the receipt, storage, or release of potential energy by the gas spring 410.

The rod 414 is configured to translate with respect to the cylinder 412. According to an exemplary embodiment, the rod 414 is coupled to or includes a piston 454 (e.g., rod end, plunger) that forms a wall of the chamber 418. When the rod 414 translates relative to the cylinder 412, the piston 454 changes the volume of the chamber 418, compressing gas in the chamber 418 or allowing the gas to expand. The gas in the chamber 418 resists compression, providing a force that is a function of the compressibility of the gas, the area of the piston 454, and the current state (e.g., initial pressure) of the gas, among other factors. As such, the gas spring 410 receives potential energy stored in the gas as the gas is compressed, and releases the potential energy as the gas expands.

The cylinder 412 of the gas spring 410 is preferably cylindrical due to structural benefits associated with cylindrical pressure vessels. However, in other contemplated embodiments, the cylinder 412 may be substituted for a body having another geometry. In some contemplated embodiments, the chamber 418 may be formed in, or at least partially formed in the rod 414. In one such embodiment, the chamber spans both the cylinder 412 and at least a portion of the interior of the rod 414.

In some embodiments, the gas spring 410 includes at least one port 422 (e.g., conduit, aperture, inlet) that may be opened to allow gas (e.g., inert gas) to be provided to or from the chamber 418. The chamber 418 of the gas spring is substantially sealed when the port 422 is not open. In some embodiments, the port 422 may be coupled to an accumulator 416, to a pump (see, e.g., pump 230 as shown in FIG. 2), or to one or more reservoirs (not shown). In some embodiments, the spring 410 includes separate ports 422, 456 associated with the accumulator 416 and the pump.

In some embodiments, the gas spring 410 further includes at least one port 422 that may be opened to allow a source of a higher pressure gas or a sink of a lower pressure gas (see generally accumulator 416, or pump 230 as shown in FIG. 2) to be coupled to the gas spring 410. Coupling the higher pressure source to the gas spring 410 increases the pressure in the gas spring 410, causing the gas spring 410 to expand and increasing the ride height of the axle assembly. Conversely, coupling the lower pressure sink to the gas spring 410 decreases the pressure in the gas spring 410, causing the gas spring 410 to contract and decreasing the ride height of the axle assembly.

According to an exemplary embodiment, the gas spring 410 is coupled directly to a pump (see, e.g., pump 230 as shown in FIG. 2), to increase or decrease pressure in the gas spring 410 corresponding to a desired ride height. In still another contemplated embodiment, a gas spring further includes at least one port that may be opened to allow hydraulic fluid (e.g., oil) to be provided to or from a spring, where adding or removing the hydraulic fluid changes the overall length of the spring for different ride heights of the suspension system. However using pressurized gas to change the length of the gas spring 410 may be preferable in some embodiments because of reduced frictional losses associated with a flow of gas compared to more viscous hydraulic fluid.

According to an exemplary embodiment, the accumulator 416 includes a rigid exterior 424 (e.g., shell, housing) and a flexible, inflatable bladder 426 within the rigid exterior 424. A second chamber 420 is located between the rigid exterior 424 and the bladder 426. According to an exemplary embodiment, the accumulator 416 is positioned proximate to the cylinder 412 and rod 414, and the second chamber 420 of the accumulator 416 is connected to the first chamber 418, formed between the cylinder 412 and rod 414 in the spring 410, by way of the gas transfer port 422. The gas transfer port 422 may include a valve 428 (e.g., check valve, poppet) for controlling access between the first and second chambers 418, 420. The valve 428 may serve to optionally disconnect the second chamber 420 of the accumulator 416 from the first chamber 418 of the spring 410, or to optionally contain gas in the second chamber 420 having a pressure exceeding or lower than gas in the first chamber 418.

In some embodiments, when the valve 428 is open, the first chamber 418 is in gaseous communication with the second chamber 420 such that a continuous body of gas extends between the two chambers 418, 420. No intermediate hydraulic fluid or mechanical element is included to transfer energy from the first chamber 418 to the second chamber 420 or vice versa. In some such embodiments, the only hydraulic fluid associated with the gas spring assembly 410 is a thin film between the rod and cylinder that moves during compression or extension of the rod 414. Use of the continuous body of gas for gaseous communication between the first and second chambers 418, 420 is intended to reduce frictional losses associated with energy transfer between the first and second chambers 418, 420, as may otherwise occur with hydraulic or mechanical intermediate elements. However, in other contemplated embodiments, hydraulic or mechanical intermediate elements may be used.

During use of the gas spring assembly 410, in some embodiments, the bladder 426 is inflated to an initial pressure. As the rod 414 and cylinder 412 are moved together, such as when the associated vehicle drives over a bump, gas in the chamber 418 compresses, providing a first spring rate for the gas spring assembly 410. In such embodiments, the pressure of the gas in the first chamber 418 is communicated to the accumulator 416 via the transfer port 422. If the pressure of the gas communicated from the first chamber 418 is below the initial pressure of the bladder 426, then the gas spring assembly 410 will respond to the bump with the first spring rate. However, if the pressure of the gas communicated from the first chamber 418 exceeds the initial pressure in the bladder 426, then the bladder 426 will compress, increasing the effective volume of the second chamber 418, which provides a second spring rate to the gas spring assembly 410.

In some such embodiments, a pump (see, e.g., pump 230 as shown in FIG. 2) may be coupled to the bladder 426 to increase the initial pressure of the bladder 426 and thereby increase the threshold amount of loading required to achieve compression of the bladder 426, which would increase the loading required to initiate the second spring rate. Gas may be released from the bladder 426 to decrease the threshold. As such, the value of the initial pressure of the bladder 426 may be set to achieve a desired responsiveness of the gas spring assembly 410. Use of the first and second spring rates is intended to reduce peak forces on the vehicle, improving the ride quality and durability of the vehicle. Tuning or adjustment of the threshold initial pressure allows for adjustment of the response of the gas spring assembly 410 depending upon a particular vehicle application.

According to an exemplary embodiment, the gas spring assembly further includes a sensor 442 integrated with the gas spring assembly 410 and configured to sense the relative configuration of the rod 414 and cylinder 412. In some embodiments, the sensor 442 provides a signal (e.g., digital output) that is indicative of the ride height of the associated suspension system (see, e.g., suspension system 218 as shown in FIG. 1) based upon the relative configuration of the rod 414 and cylinder 412. In contemplated embodiments, the sensor 442 includes a linear variable differential transformer (LVDT), where a shaft of the LVDT extends through the cylinder 412 to the rod 414. As the rod 414 and cylinder 412 move relative to one another, the shaft of the LVDT provides a signal (e.g., inductive current) that is a function of the movement of the shaft.

Referring now to FIGS. 5-10, a pump is shown as a hydraulically-driven high-pressure gas pump 510 that includes a housing 512 (e.g., head, body). In some embodiments, the housing 512 is formed from a first shell 514 (e.g., piece), corresponding to a pumping side 516 of the pump 510 that is configured for pressuring gas; and a second shell 518, corresponding to an actuating side 520 of the pump 510 that is configured to use hydraulic fluid to drive the pumping side 516. According to an exemplary embodiment, the first and second shells 514, 518 are fastened together with nuts 522 and bolts 524. The bolts 524 extend through apertures formed in the first and second shells 514, 518. In other embodiments, screws, welds, or other fasteners or combinations of fasteners may be used to fasten two or more pieces together to form a pump housing.

According to an exemplary embodiment, the pumping side 516 of the pump 510 includes three ports (e.g., openings, apertures): an inlet fitting 526, an outlet fitting 528, and a purge valve 530. The inlet and outlet fittings 526, 528 are configured to receive mating fittings of associated high-pressure gas lines (e.g., hoses, piping, plumbing). Hexagonal sections 532, 534 of the inlet and outlet fittings 526, 528 facilitate fastening or removal of the fittings 526, 528 from the first shell 514. The purge valve 530 may be configured to receive a mating fitting from an associated line, or may be configured to open and vent gas from the pump 510 to the atmosphere, to facilitate maintenance of the pump 510 or for other purposes.

Figure 19:
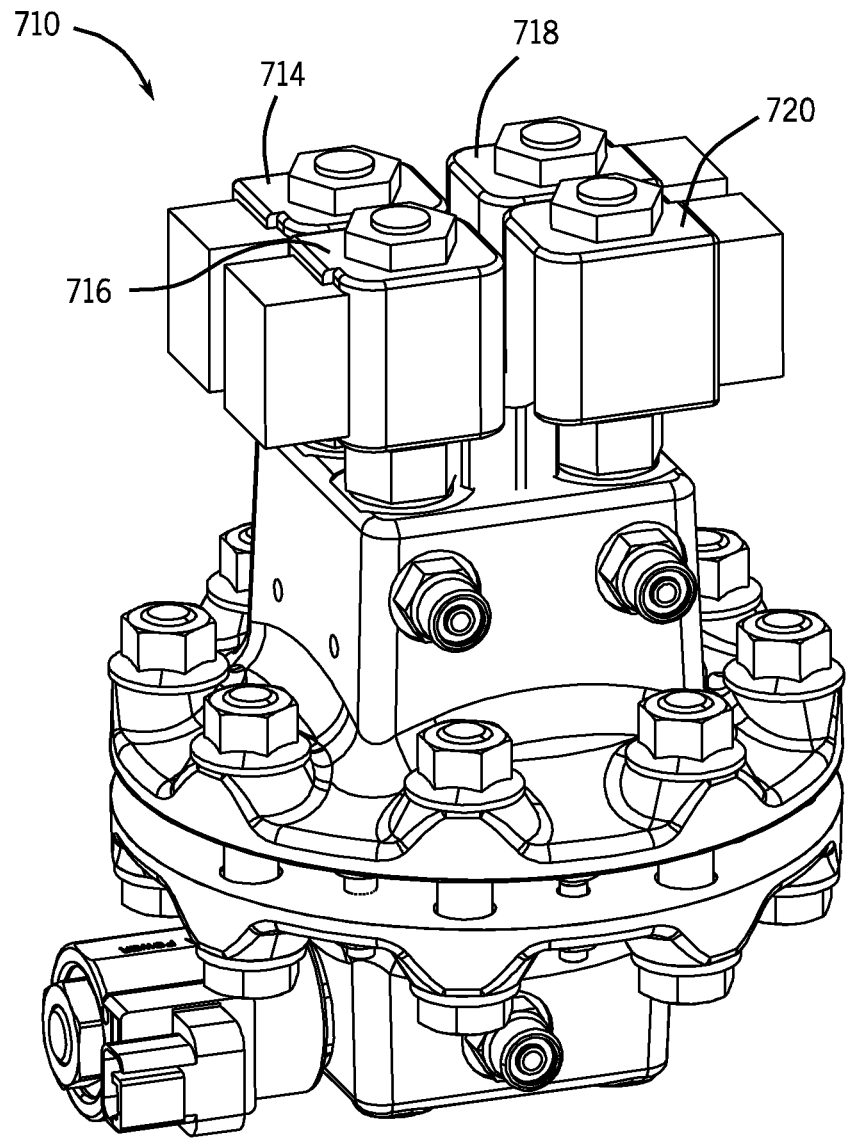
FIG. 19 is a perspective view of a pump according to yet another exemplary embodiment of the invention.

Heads 540, 542 of check valves 536, 538 extend from the top of the first shell 514. One check valve 536 is associated with the passage (not shown) from the inlet fitting 526, and the other check valve 538 is associated with the passage to the outlet fitting 528 such that flow through the pumping side 516 of the pump 510 is limited to a single direction in such embodiments. In other embodiments, the flow direction may be reversed through the pumping side (see generally pump 710, as shown in FIG. 19). Rotation of the heads 540, 542 adjusts tension in the associated check valves 536, 538. In other contemplated embodiments, the pumping side 516 of the pump 510 may include additional inlet fittings that connect to an inlet manifold, or the outlet fitting 528 serves to purge gases in place of the purge valve 530.

According to an exemplary embodiment, the actuating side 520 of the pump 510 includes three ports: an inlet fitting 544, an outlet fitting 546, and a bleeder 548 (e.g., bleed screw, drain). The inlet and outlet fittings 544, 546 are configured to receive mating fittings of associated hydraulic lines. Hexagonal sections 550, 552 of the inlet and outlet fittings 544, 546 allow for fastening or removal of the fittings 544, 546 from the second shell 518. The bleeder 548 allows for drainage of air, gases, or other fluid from the actuating side 520 of the pump, such as prior to operation of the pump 510 or during assembly or disassembly of the pump 510.

In some embodiments the actuating side 520 of the pump 510 also includes a modulating assembly 554. According to an exemplary embodiment, the modulating assembly 554 includes a solenoid 556 coupled to a flow-control valve (e.g., spool valve, plug valve, valve sleeve). The modulating assembly 554 controls the pressure of hydraulic fluid within the actuating side 520 of the pump 510 by opening the pump 510 to flow through the inlet fitting 544 while closing flow to the outlet fitting 546, corresponding to high pressure in the actuating side 520; and vice versa, corresponding to low pressure in the actuating side 520. In some embodiments, the modulating assembly 554 is electrically driven (e.g., electromagnetic coil), and may be operated by a microprocessor, a control circuit, a computerized controller, a timer, or otherwise. In other embodiments, the modulating assembly 554 is hydraulically driven by way of pilot connections, or mechanically driven, such as by receiving mechanical energy from a power train of an associated vehicle or piece of equipment. In other contemplated embodiments the modulating assembly is a manual ball valve.

Figure 11:
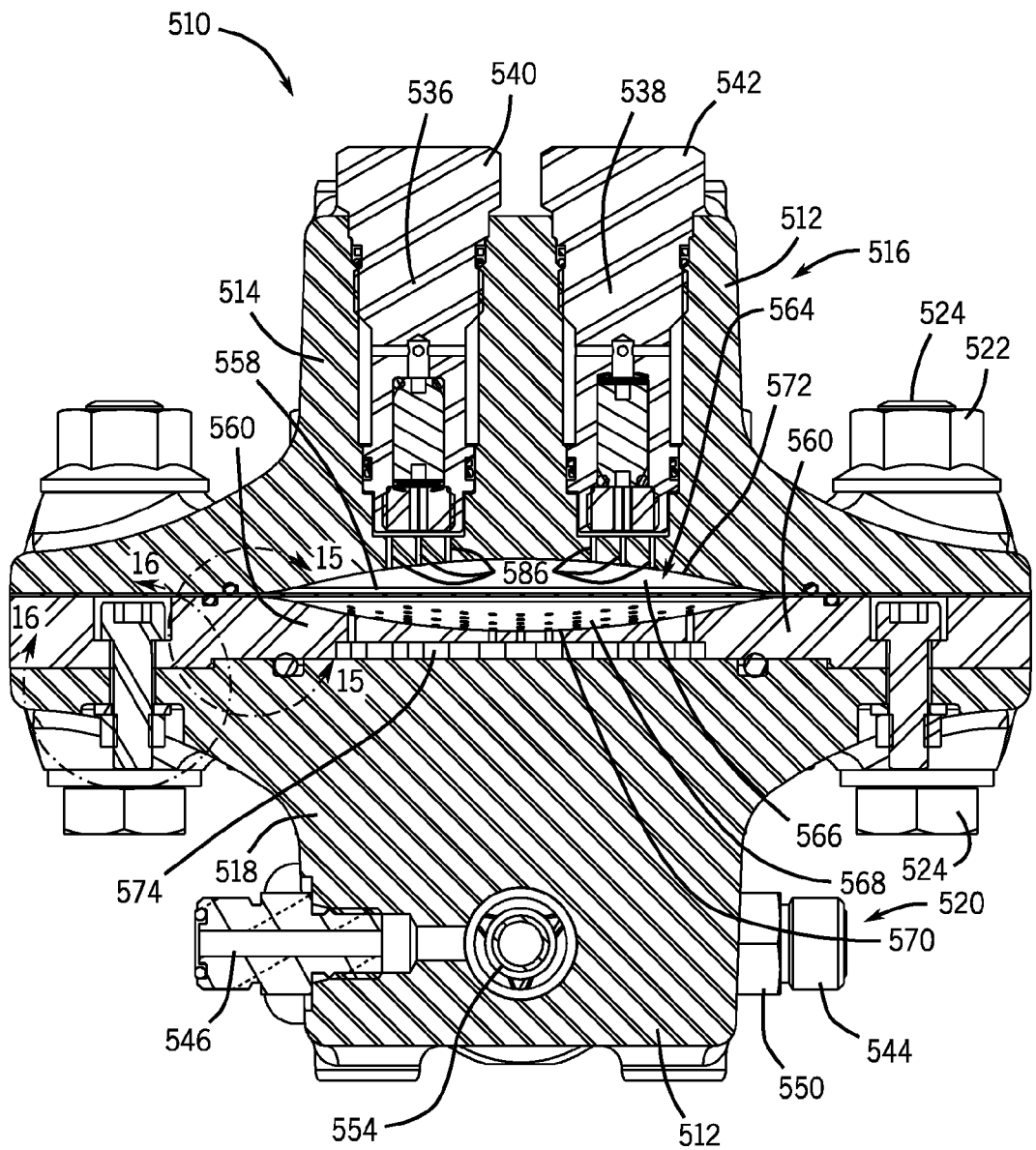
FIG. 11 is a sectional view of the pump of FIG. 5, taken along line 11-11 of FIG. 6.

Referring now to FIG. 11, between the first shell 514 and the second shell 518, the pump 510 includes a diaphragm 558 (see also FIG. 15) and a diaphragm support 560 (e.g., plate, piece, diaphragm guide). According to an exemplary embodiment, the pump 510 is assembled by first securing the diaphragm support 560 to the second shell 518 with fasteners 562 through apertures in the diaphragm support 560 and the second shell 518 (see also FIG. 16). The first shell 514 is then secured to the second shell 518 over the diaphragm 558 and the diaphragm support 560. A volume 564 is formed interior to the housing 512, between the first and second shells 514, 518, such as between the first shell 514 and the diaphragm support 560. According to an exemplary embodiment, the diaphragm 558 partitions (e.g., divides) the interior volume 564 into a pumping chamber 566 and an actuating chamber 568.

According to an exemplary embodiment, the diaphragm support 560 is associated with (e.g., positioned in, located in, at least partially defines) the actuating chamber 568 of the pump 510. As pressure in the actuating chamber 568 of the pump 510 is low (i.e., the volume of hydraulic fluid in the actuating chamber 568 is low), the diaphragm 558 stretches toward the diaphragm support 560, which pulls gas through the inlet fitting 526 and associated check valve 536 into the pumping chamber 566. In some embodiments, the diaphragm support 560 serves to limit movement of the diaphragm 558 during such an intake stroke of the diaphragm 558. The diaphragm support 560 obstructs further deflection of the diaphragm 558, which is intended to prevent excessive stretching of the diaphragm 558, possibly leading to wear or fatigue of the diaphragm 558.

During operation, the diaphragm 558 deflects to a greater degree closer to the center of the diaphragm 558. According to an exemplary embodiment, the diaphragm support 560 forms a concave recess 570 proximate to the diaphragm 558. In some embodiments the concave recess 570 is rounded, bowl-shaped, sinusoidal, or otherwise shaped. Use of a concave recess 570 is intended to facilitate an even distribution of stresses (e.g., shear stresses) within the diaphragm 558 to improve the life the diaphragm 558 by providing a guide surfaces that corresponds to the shape of the stretched diaphragm, instead of providing a surface having sources of stress concentrations. In some embodiments, the inside surface 572 of the first shell 514 forms a concave recess that substantially mirrors the concave recess 570 of the diaphragm support 560.

According to an exemplary embodiment, the diaphragm 558 is at least partially formed from a polymeric material (e.g., a polymeric diaphragm). The polymeric material is believed to be stiffer than material of an elastomeric diaphragm (e.g., rubber or synthetic rubber) of equal dimensions, while less rigid than metal of a metal diaphragm. A polymeric material is believed to be about two to three times stronger than an elastomeric diaphragm. According to an exemplary embodiment, the polymeric material is a thermoplastic elastomer, while in other embodiments the polymeric material is thermoset. In at least one embodiment, the thermoplastic elastomer of the polymeric diaphragm is polyester based. According to an exemplary, a polymeric diaphragm is about $20/1000$ inch thick with about a 6.25 inch outer diameter.

Use of the diaphragm 558 including the polymeric material in some embodiments allows for a greater stroke volume relative to a comparably sized metal diaphragm, such as more than a cubic inch or about 1.5 cubic inches of stroke volume for a six-inch polymeric diaphragm having a working diameter of about four inches (e.g., 3.5 inches). With a polymeric diaphragm, the flow rate of hydraulic fluid through the actuating chamber 568 is more than a gallon per minute, such as about 1.5 gallons per minute. The combination of the polymeric diaphragm and the diaphragm support 560 allows for a greater stroke volume (compared to metal diaphragms) at pumping pressures of greater than 2000 pounds per square inch, such as about 3000 pounds per square inch, which are pressures believed to exceed the capacity comparably-sized elastomeric diaphragms. In some embodiments, the pump has outer diameter of less than a foot, such as about six inches. In other contemplated embodiments, a diaphragm support is used with a metal or elastomeric diaphragm, such as in pumps intended for different ranges of operating pressures, flow rate, different fluids, etc.

Figure 12:
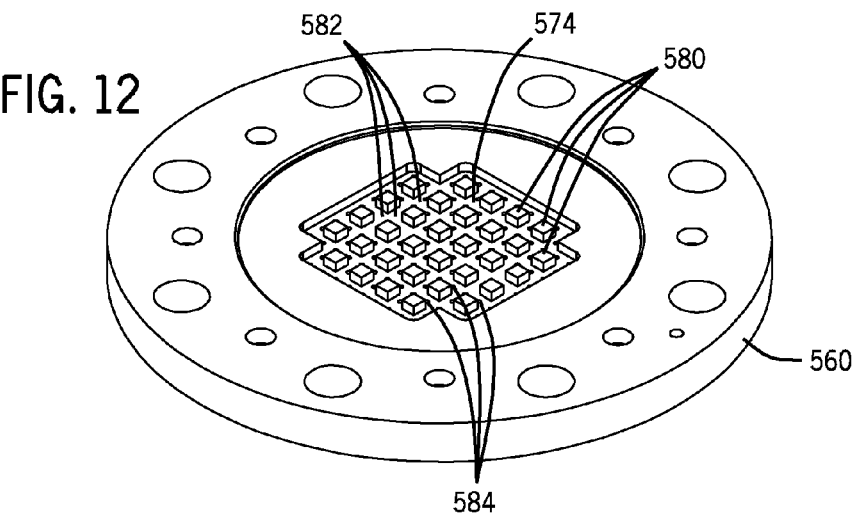
FIG. 12 is a perspective view of a portion of the pump of FIG. 5.
Figure 13:
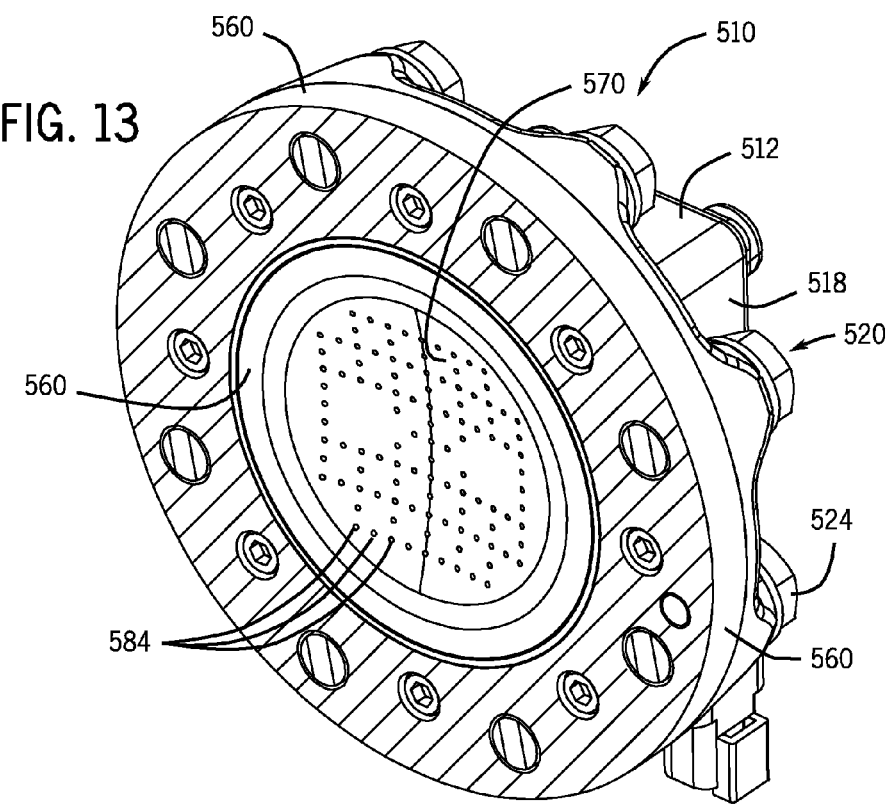
FIG. 13 is a sectional view of the pump of FIG. 5, taken along line 13-13 of FIG. 6.
Figure 14:
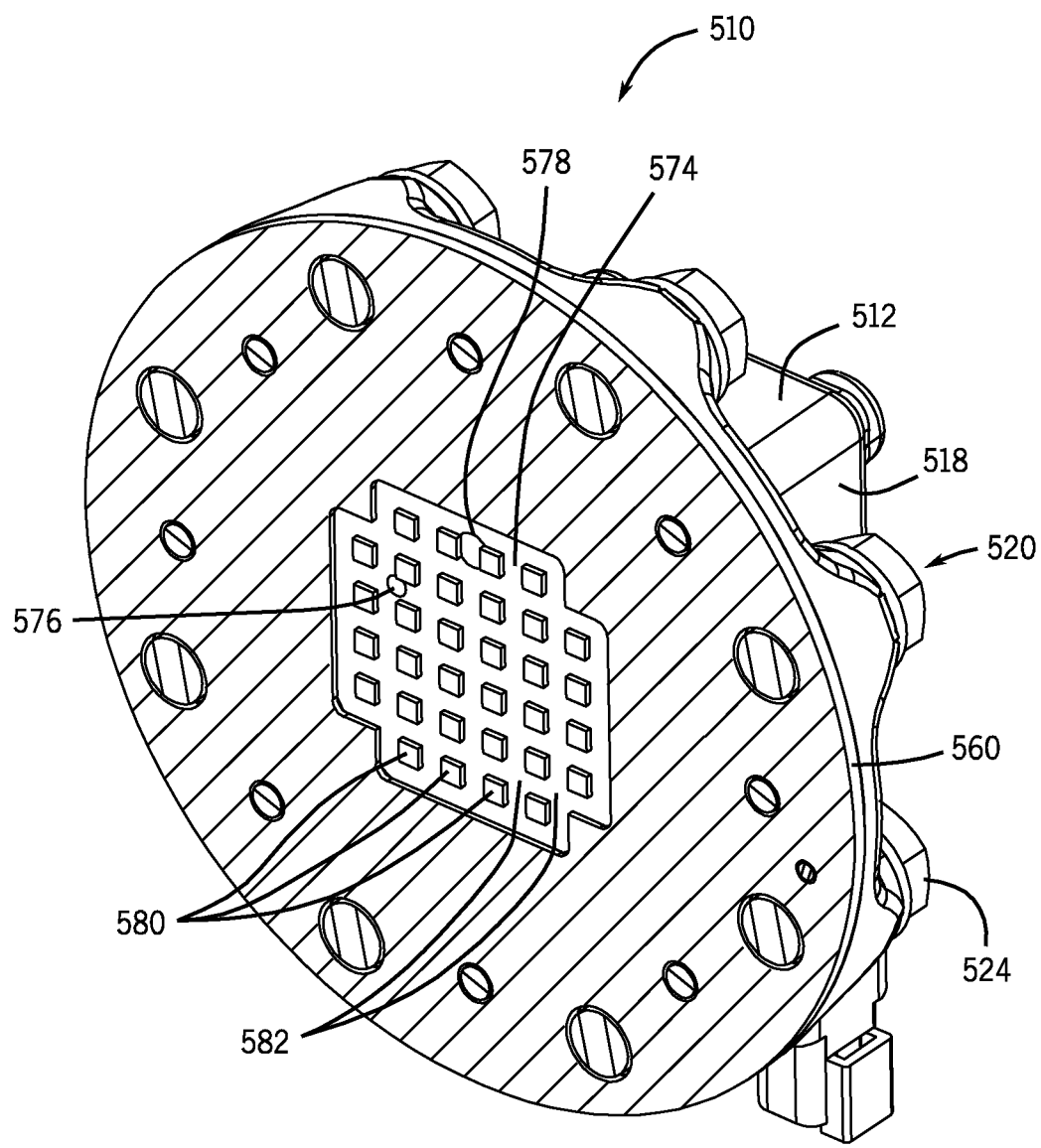
FIG. 14 is a sectional view of the pump of FIG. 5, taken along line 14-14 of FIG. 6.

Referring now to FIGS. 12-14, the pump further includes a dispersion element 574 (FIGS. 12 and 14) designed to facilitate lateral or radial transfer of hydraulic fluid within the actuating chamber 568 of the pump 510. Hydraulic fluid enters and exits the dispersion element 574 through an opening 578 (FIG. 14) in communication with the inlet fitting 544. The hydraulic fluid then spreads out laterally throughout open areas of the dispersion element 574 so that fluctuations in the pressure of the hydraulic fluid are distributed throughout the actuating chamber 568. The hydraulic fluid may also exit the dispersion element 574 through a bleeder outlet 576 (FIG. 14) in communication with the bleeder 548.

According to an exemplary embodiment, the dispersion element communicates hydraulic fluid to the diaphragm over a wider area of the diaphragm than would a single, cylindrical conduit. In contemplated embodiments, the dispersion element includes two or more conduits that separate a flow of hydraulic fluid and provide the hydraulic fluid to separate parts of the diaphragm. In other contemplated embodiments, the dispersion element includes a porous metal piece that includes a large number of very small holes, where the small holes spread the hydraulic fluid across a wider area of the diaphragm than would a single cylindrical conduit. In still other embodiments, various other forms of dispersion elements are used.

In some embodiments, the center of the diaphragm support 560 may be thin, such as in the center of the concave recess 570. At high pumping pressures fluctuating over many oscillations, the center of the diaphragm support 560 may be susceptible to wear or fatigue. According to an exemplary embodiment, the dispersion element 574 includes an array of pillars 580 (FIGS. 12 and 14) designed to reinforce the structure of diaphragm support 560. The pillars 580 extend from structure of the second shell 518, through the dispersion element 574, and to the diaphragm support 560. The pillars 580 may be symmetrically arranged, or may be otherwise arranged. In some embodiments, the pillars 580 are square, rectangular, round, oval, or otherwise shaped. In other contemplated embodiments, the diaphragm support is constructed with a thicker cross-section or a stronger material, and additional reinforcement of the center is not provided.

A network of channels 582 (FIGS. 12 and 14) extends around the pillars 580, where the hydraulic fluid spreads out within the dispersion element 574 through the network of channels 582. An array of apertures 584 (FIGS. 12 and 13) in the concave recess 570 of the diaphragm support 560 connects to the network of channels 582, allowing hydraulic fluid from the dispersion element 574 to influence the diaphragm 558. According to an exemplary embodiment, the apertures 584 of the diaphragm support 560 have a cross-sectional width of between a hundredth and a quarter of an inch. The cross-sectional width and geometry (e.g., round, oblong, etc.) is intended to provide apertures 584 that are wide enough to allow relatively free passage of the hydraulic fluid, without excessive pressure loss, while narrow enough to avoid excessive stretching of the diaphragm 558 through the apertures 584 as the diaphragm 558 contacts the diaphragm support 560 during an intake stroke.

According to an exemplary embodiment, the diaphragm support 560 and the dispersion element 574 are integrally formed (e.g., cast, machined) in a single continuous body. FIG. 12 shows such a body, and FIGS. 13-14 show sectional view of such a body integrated with the pump 510. In other embodiments, the diaphragm support 560 and dispersion element 574 are adjacent, but are formed from separate pieces fastened together. While FIGS. 12 and 14 show the dispersion element 574 to include the array of pillars 580, in other embodiments, the dispersion element is formed from a series of counter-bore conduits, or other structures for laterally spreading the hydraulic fluid. The dispersion element does not reinforce the diaphragm support in some embodiments.

According to an exemplary embodiment, the pumping side 516 of the pump 510 uses an array of holes 586 (FIG. 11), between the check valves 536, 538 and the pumping chamber 566. The holes 586 are sized to minimize the volume of gas in the pumping chamber 566 when the diaphragm 558 is at the bottom of a stroke, where the volume in the pumping chamber 566 is at a minimum. Because gas is compressible, reducing the volume of the pumping chamber 566 that is outside of the stoke of the diaphragm 558 improves the efficiency of the pump 510. Less energy is wasted by compressing gas that stays within the pumping chamber 566.

Figure 15:
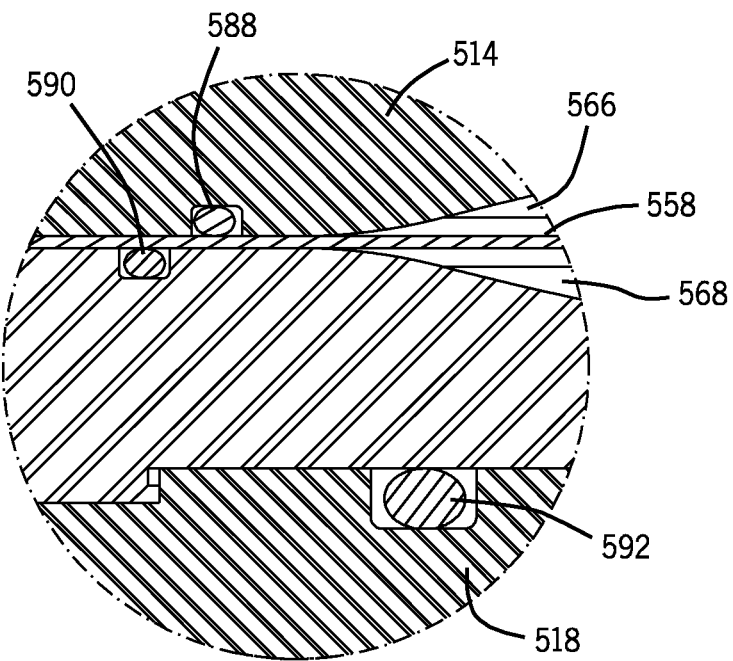
FIG. 15 is a sectional view of the pump of FIG. 5, taken along line 15-15 of FIG. 11.
Figure 16:
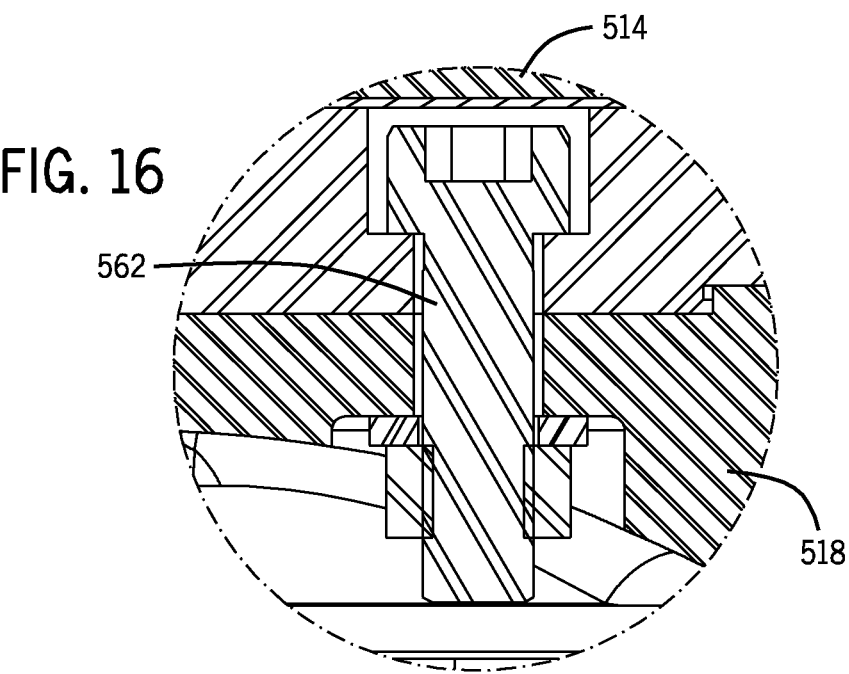
FIG. 16 is a sectional view of the pump of FIG. 5, taken along line 16-16 of FIG. 11.

Referring to FIG. 15, O-rings, gaskets or other seals may be used to limit leaking of hydraulic fluid or gas from (or to) the pump 510. According to an exemplary embodiment, an O-ring 588 is positioned between the first shell 514 and the diaphragm 558, another O-ring 590 is positioned between the diaphragm 558 and the diaphragm support 560, and yet another O-ring 592 is positioned between the diaphragm support 560 and the second shell 518. Nuts and bolts 522, 524 used to couple the first and second shells 514, 518 compress the O-rings 588, 590, 592 to form seals of the pump 510.

Figure 17:
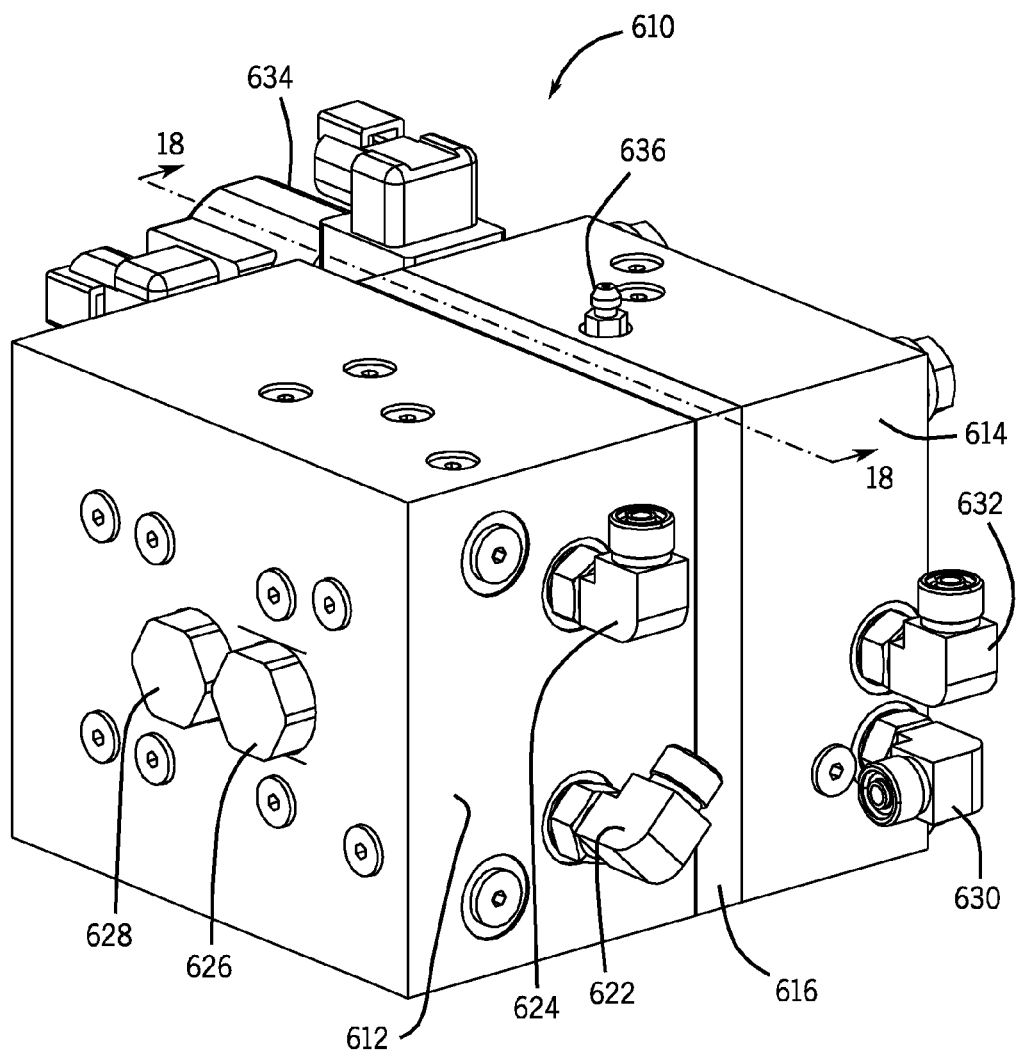
FIG. 17 is a perspective view of a pump according to another exemplary embodiment of the invention.
Figure 18:
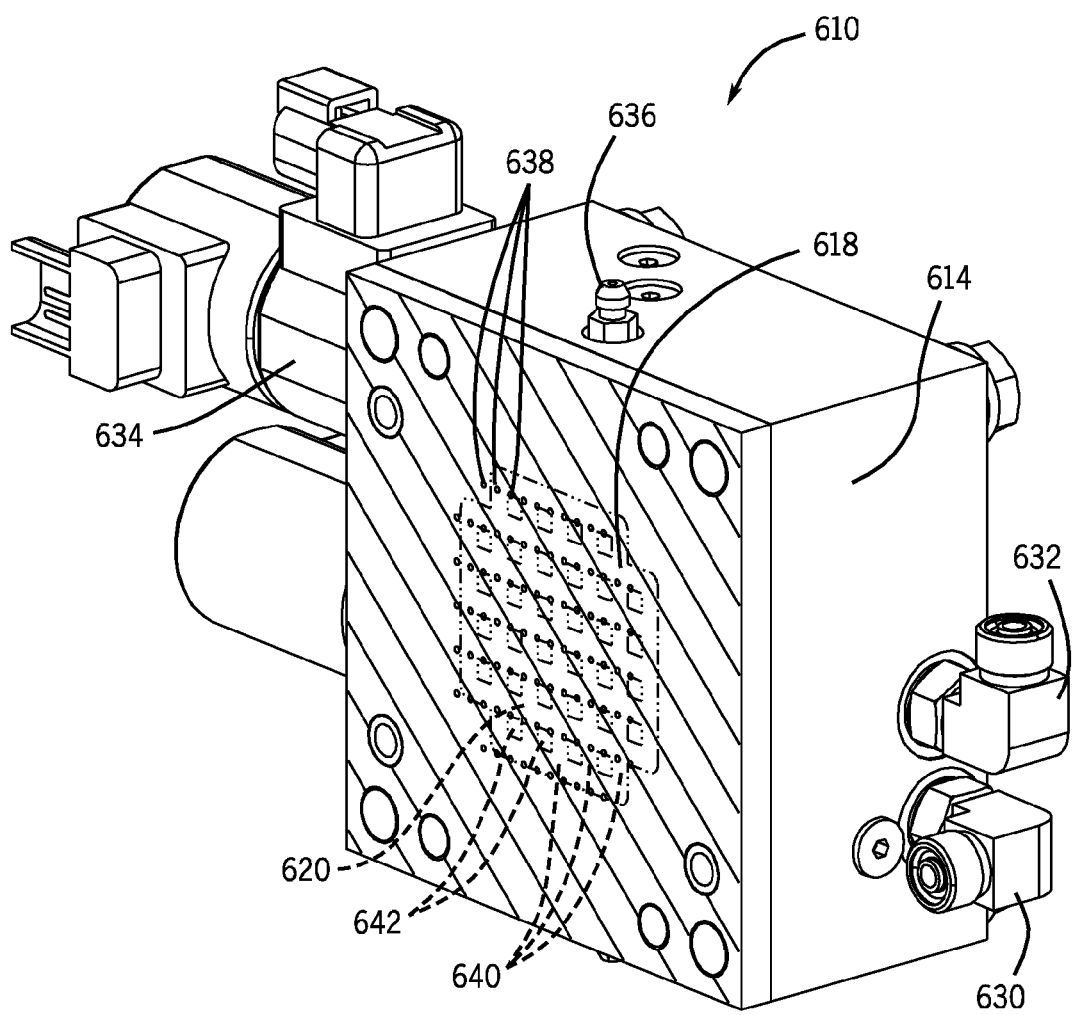
FIG. 18 is a sectional view of the pump of FIG. 17 taken along line 18-18 of FIG. 17.

Referring now to FIGS. 17-18, a pump 610 includes first and second shells 612, 614 fastened together over a piece 616 (e.g., plate, body) having a diaphragm support 618 (FIG. 18) and fluid dispersion element 620 (FIG. 18) integrated with the piece 616. The first shell 612 includes inlet and outlet fittings 622, 624, with associated check valves 626, 628, for receiving and supplying a fluid that is worked upon by the pump 610 (e.g., inert gas, air, water, hydraulic fluid, etc.). The second shell 614 includes inlet and outlet fittings 630, 632 and a modulating assembly 634, for controlling the flow of a working fluid (e.g., hydraulic fluid, water, air, etc.) through the inlet and outlet fittings 630, 632. In other contemplated embodiments, a modulating assembly may be separate from the pump 610. A bleeder 636 allows for draining of working fluid within the second shell 614, such as prior to operation or disassembly of the pump 610.

According to an exemplary embodiment, the pump 610 is a bi-directional pump, where the inlet and outlet fittings 622, 624 are configured to be reversible by way of valving integrated with the pump 610. In some embodiments, the valving includes a hydraulic spool valve that controls pilot operated check valves, which determine whether the inlet and outlet fittings 622, 624 will be switched to change the direction of the pump. Accordingly the pump 610 is configured to receive gas (e.g., nitrogen) from a storage tank and provide the gas to a strut (e.g., gas spring 220 as shown in FIG. 2) regardless of whether the strut or the storage tank has a greater pressure. Furthermore, the pump 610 is able to reverse the flow of gas, by switching the direction of the pilot operated check valves, so that the pump 610 delivers gas from the strut to the storage tank, again regardless of which vessel, the tank or the strut, has a greater pressure.

According to an exemplary embodiment, the diaphragm support 618 and fluid dispersion element 620 are associated with the working fluid of the pump 610. In other contemplated embodiments, a pump includes a diaphragm support or dispersion element associated with the fluid worked upon by the pump, or diaphragm supports and dispersion elements associated with both sides of the pump. As shown in FIG. 18, the piece 616 includes an array of apertures 638 of the diaphragm support 618 extending from a network of channels 640 of the dispersion element 620. The apertures 638 communicate the working fluid through the piece 616 during operation of the pump 610. Pillars 642 integrated with the piece 616 reinforce the structure of the diaphragm support 618.

Referring to FIG. 19, a pump 710 includes a system for switching the direction of gas flowing through the pump 710. The system includes double-acting solenoid valves 714, 716, 718, 720. According to an exemplary embodiment, the pump 710 is configured to be coupled to one or more gas springs (see, e.g., gas spring 220 as shown in FIG. 1), to change a ride height of a vehicle by adding or removing gas from the one or more of the springs. In one configuration, two of the valves 714, 716 are associated with a first direction of gas flowing through the pump 710, such as from a supply tank to gas springs; and the other two valves 718, 720 are associated with a second direction of gas flowing through the pump 710, such as from the gas springs to the supply tank.

Delivering pressurized gas to the springs allows for ride height increases of an associated suspension system (see, e.g., suspension system 218 as shown in FIG. 2), while using the pump 710 to draw gas from the gas springs may allow for improved speed and control of ride height decreases. The valves 714, 716, 718, 720 include electrical connectors (represented by boxes) and may be operated by a computerized controller, allowing for ride height adjustment of the associated gas springs to be controlled in accordance with a suspension system control algorithm. While described for use with a suspension system, the pump 710 is configured to be used with a wide variety of equipment, and is not limited to vehicle suspension systems unless expressly stated in the claims.

While some embodiments include intermediate high and low pressure storage tanks that raise and lower an associated strut, and which are pressurized by the pump 510. In other embodiments, a bi-directional pump (e.g., pumps 610, 710) provides gas from a storage tank to a strut to increase the length of the strut for an associated increased ride height, and also draws gas from the strut, when the pump is operated in reverse, to decrease the length of the strut for an associated lower ride height. In still other embodiments, a single-direction pump provides gas to and receives gas from a strut, and essentially functions as a bi-directional pump by way of an associated switching manifold that is external to the pump. Bi-directional pumps may allow for a reduced volume of gas for operation of the system and fewer gas storage containers, as a single reservoir may be used in place of high and low pressure reservoirs to raise and lower the strut. Furthermore, use of such pumping systems allows for a closed circuit of an inert gas, which is reused and not vented to the atmosphere.

The construction and arrangements of the pump and suspension system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A pump, comprising:
   a housing defining an interior volume;
   a diaphragm partitioning the interior volume into a pumping chamber and an actuating chamber;
   a diaphragm support associated with the actuating chamber and configured to limit movement of the diaphragm; and
   a dispersion element coupled to the housing, the dispersion element defining (a) a plurality of apertures extending through the dispersion element and (b) a network of channels extending through a plurality of protrusions, wherein the network of channels is configured to spread out a fluid within the pump.

2. The pump of claim 1, wherein the diaphragm support forms a concave recess adjacent to the diaphragm, and wherein the array of columns is positioned to reinforce the diaphragm support.

3. The pump of claim 1, wherein the housing defines a flow path between an inlet and the actuating chamber, wherein the dispersion element is positioned along the flow path between the diaphragm support and the inlet.

4. The pump of claim 3, wherein the plurality of apertures define a portion of the flow path.

5. The pump of claim 4, wherein the plurality of apertures each have a cross-sectional width between a hundredth and a quarter of an inch.

6. The pump of claim 4, wherein the plurality of apertures are connected to the network of channels.

7. The pump of claim 6, wherein the diaphragm support and the dispersion element are integrally formed as parts of a continuous body of material.

8. The pump of claim 3, further comprising a modulating assembly positioned along the flow path, wherein the housing defines an outlet in fluid communication with the actuating chamber, and wherein the modulating assembly is configured to selectively place the actuating chamber in fluid communication with the inlet or the outlet.

9. The pump of claim 8, wherein the modulating assembly includes an actuator coupled to a valve.

10. The pump of claim 1, wherein the housing comprises a first shell and a second shell, and wherein the diaphragm, the diaphragm support, and the dispersion element are fastened between the first shell and the second shell.

* * * * *